(12) United States Patent
Klijn et al.

(10) Patent No.: US 8,390,701 B2
(45) Date of Patent: Mar. 5, 2013

(54) METHOD FOR PROCESSING AN IMAGE SIGNAL FOR DOUBLE OR MULTIPLE EXPOSURE CAMERAS

(75) Inventors: Jan Klijn, Breda (NL); Johan Schirris, Veldhoven (NL); Sasa Cvetkovic, Eindhoven (NL); Peter Sturm, Waalre (NL)

(73) Assignee: Robert Bosch GmbH, Stuttgart (DE)

( * ) Notice: Subject to any disclaimer, the term of this patent is extended or adjusted under 35 U.S.C. 154(b) by 421 days.

(21) Appl. No.: 12/770,447

(22) Filed: Apr. 29, 2010

(65) Prior Publication Data

US 2011/0267506 A1 Nov. 3, 2011

(51) Int. Cl.
*H04N 9/73* (2006.01)

(52) U.S. Cl. .......... 348/226.1; 348/222.1; 348/229.1

(58) Field of Classification Search ........ 348/222.1, 348/226.1, 229.1
See application file for complete search history.

(56) References Cited

U.S. PATENT DOCUMENTS

| | | | |
|---|---|---|---|
| 6,710,818 B1* | 3/2004 | Kasahara et al. | 348/607 |
| 7,312,823 B1* | 12/2007 | Mori | 348/269 |
| 7,636,109 B2* | 12/2009 | Nakajima et al. | 348/226.1 |
| 7,821,547 B2* | 10/2010 | Suzuki | 348/226.1 |
| 7,876,365 B2* | 1/2011 | Kuno et al. | 348/227.1 |
| 2003/0081139 A1* | 5/2003 | Hofer et al. | 348/362 |
| 2003/0081830 A1* | 5/2003 | Sobol et al. | 382/167 |
| 2003/0090587 A1* | 5/2003 | Hofer et al. | 348/349 |
| 2004/0051791 A1* | 3/2004 | Hashimoto | 348/226.1 |
| 2005/0237394 A1* | 10/2005 | Katiblan et al. | 348/226.1 |
| 2006/0033823 A1* | 2/2006 | Okamura | 348/254 |
| 2006/0132859 A1* | 6/2006 | Kalapathy et al. | 358/463 |
| 2006/0197846 A1* | 9/2006 | Nose | 348/226.1 |
| 2007/0046789 A1* | 3/2007 | Kirisawa | 348/226.1 |
| 2008/0218599 A1* | 9/2008 | Klijn et al. | 348/229.1 |
| 2010/0045819 A1* | 2/2010 | Pillman et al. | 348/226.1 |

FOREIGN PATENT DOCUMENTS

WO 2007/038977 4/2007

\* cited by examiner

*Primary Examiner* — Chieh Fan
*Assistant Examiner* — Antoinette Spinks
(74) *Attorney, Agent, or Firm* — Kenyon & Kenyon LLP

(57) ABSTRACT

Methods are described for processing an image signal for double or multiple exposure cameras in order to reduce fluorescent artifact effects.

3 Claims, 9 Drawing Sheets

METHOD FOR PROCESSING AN IMAGE SIGNAL FOR DOUBLE OR MULTIPLE EXPOSURE CAMERAS

FIELD OF THE INVENTION

The present invention relates to methods for processing an image signal for double or multiple exposure cameras in order to reduce fluorescent artifact effects.

BACKGROUND INFORMATION

Multi-exposure techniques are widely used for improving the dynamic range of video cameras. The dynamic range of a video signal generated by an image sensor is limited by its noise floor on the one hand and the saturation voltage on the other hand. For the lowest level in a typical scene, the signal to noise ratio (SNR) needs to be at least about 40 dB to have an acceptable quality. Therefore the total dynamic range should be 100 dB.

To achieve this, there is known the double exposure solution, where two pictures are taken shortly after one another: one with a short exposure time and one with a long exposure time. Combining the two can give a good SNR for the long exposed image in the dark part and can avoid saturation in the bright part for the short exposed image.

However, in artificial light sources, particularly fluorescents, light is modulated at twice the local mains frequency. If the integration time of the sensor is not a multiple of the period of the fluorescent light source, the amount of integrated light varies per field (frame), which creates a problem of flickers and changing colors.

The frequency of fluorescent light flicker is either 100 Hz or 120 Hz, according to national standards, and can vary up to 2%. To cope with this problem, there is usually provided either a manual switch or a flicker detection mechanism that sets the sensor integration time to an integer number of the fluorescence period (e.g. n/100 s or n/120 s respectively, depending on the national mains frequency, n=1,2,3, ... ).

This special operation is a valid solution for single exposure time sensors, but leads to problems in connection with multiple exposure time sensors. If, for instance, the longer exposure time is chosen as $\frac{1}{100}$ s, the shorter exposure (integration) time will be several times shorter than that of the longer exposure time (the exact relation depends on their ratio R) and will not be adequate for the operation under fluorescence light conditions.

International Patent Application WO 2007/038977 A1 discusses an image pickup apparatus comprising an image pickup arrangement for forming a plurality of image signals having different exposure conditions, a combining arrangement for combining said plurality of image signals to form a combined image signal having an extended dynamic range, further comprising display and/or a recording arrangement for displaying and/or recording said combined image signal, further comprising a function module correcting at least one of the image signals in order to achieve a smooth transition between the image signals at a transition point.

SUMMARY OF THE INVENTION

It is an object of this invention to improve performance of a double or multiple exposure camera in the presence of fluorescent light.

According to a first aspect of the exemplary embodiments and/or exemplary methods of the present invention there is provided a method for processing an image signal for double or multiple exposure cameras comprising the following steps:
a) determining whether fluorescent light is present,
b) if so, ascertaining the period of the fluorescent light,
c) forming a plurality of image signals having different exposure conditions with at least one image pickup sensor, such that at least a long exposure time is made equal to a multiple of the fluorescent light period, and a short exposure time is made equal to a fraction of the long exposure time,
d) correcting at least part of the plurality of image signals with a correction function in order to obtain a corrected output signal,
e) combining at least one of said plurality of image signals and said corrected output signal to form a combined image signal, and
f) applying a gain factor G to the combined image signal, so that at least some image areas originating from the short exposure time are shifted out of a display range.

By applying a gain, problematic image parts which are, in the prior art, constructed from short exposure time, are essentially shifted out of the display range. At the same time, the lens is closed in such a way that same average light output is achieved as before the application of the gain.

To further improve the removal of the false colors, color saturation is reduced.

According to a further aspect of the exemplary embodiments and/or exemplary methods of the present invention, there is provided a method for processing an image signal for double exposure cameras comprising the following steps:
a) determining whether fluorescent light is present,
b) if so, ascertaining the period and the phase of the fluorescent light period,
c) forming a plurality of image signals having different exposure conditions with at least one image pickup sensor, such that at least a long exposure time is made equal to a multiple of the fluorescent light period, and a short exposure time is made equal to a fraction of the long exposure time,
d) phase-locking the short exposure time to the period of the fluorescent light such that it essentially coincides with the maximum or the area around the maximum of the period of the fluorescent light,
e) correcting at least part of the plurality of image signals with a correction function in order to obtain a corrected output signal, and
f) combining at least one of said plurality of image signals and said corrected output signal to form a combined image signal.

Herein, essentially a fluorescent locking is performed so that the time, within which the short exposure integration is being performed, is positioned at the optimum moment within the fluorescent light period, i.e. at or around the peak (maximum) of the fluorescent light output.

For both aspects of the exemplary embodiments and/or exemplary methods of the present invention, it is advantageous to determine, whether fluorescent light is present, by monitoring color differences between long exposure times and short exposure times overtime. If color errors ascertained herein change over time, it is an indication that fluorescent light is present, and that the camera is not locked to the main frequency.

These measurements can not be performed over the saturated pixels originating from the long exposure, but only from intensity area where both long and short exposed pixels are not saturated.

According to a further aspect of the exemplary embodiments and/or exemplary methods of the present invention, an image pickup apparatus is provided for forming a plurality of image signals having different exposure conditions, comprising an arrangement for determining whether fluorescent light is present, an arrangement for combining a plurality of image signals to form a combined image signal, and further comprising an arrangement for processing the combination of plurality of image signals taking into account the determination, whether fluorescent light is present or not.

The accompanying drawings, which are incorporated in and constitute a part of the specification, show embodiments of the present invention and, together with the description, serve to explain the principles of the exemplary embodiments and/or exemplary methods of the present invention.

DETAILED DESCRIPTION

Figure 1:
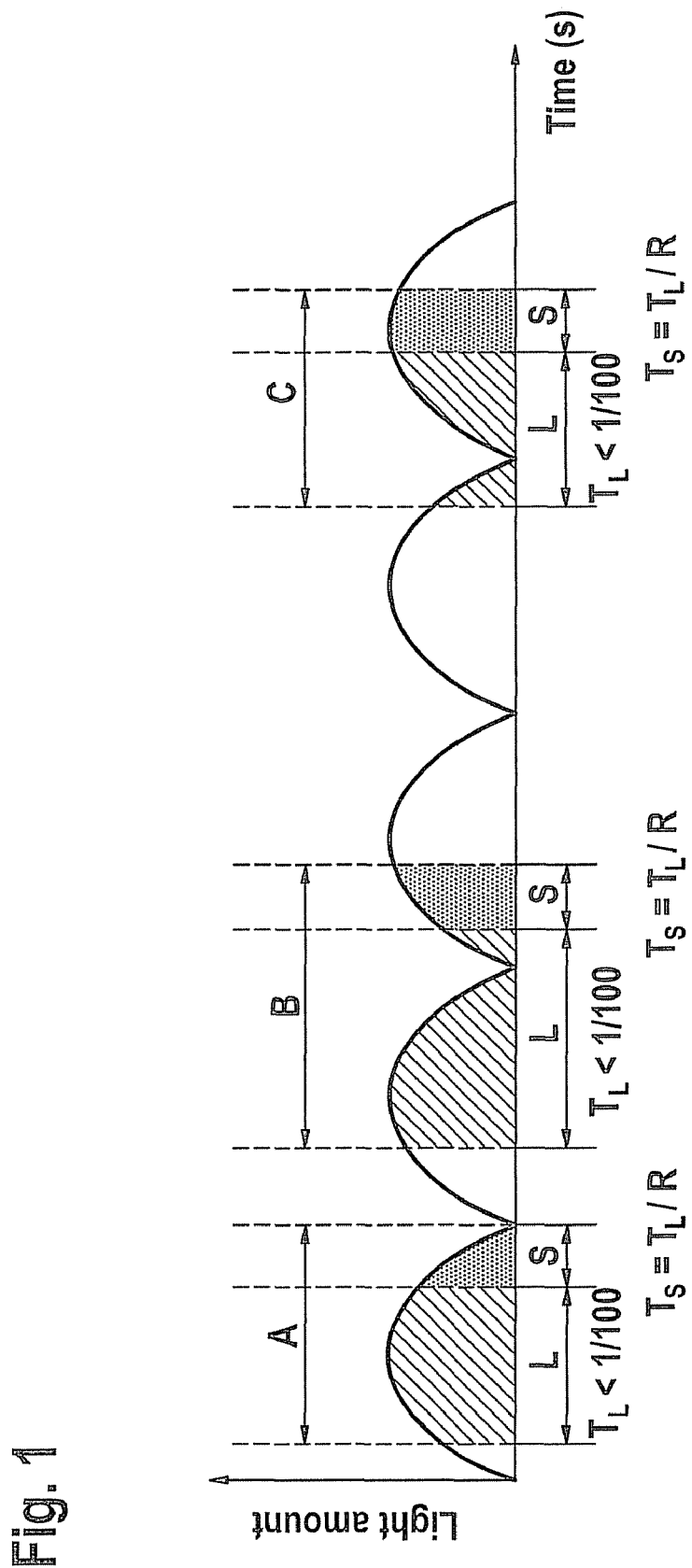
FIG. 1 shows a graph for illustrating the influence of fluorescent light on the amount of light in a scene, over time.

In FIG. 1, one can observe the influence of the fluorescent light on the amount of light in the scene. In case of a 50 Hz mains frequency, output light oscillates with 100 Hz frequency. If along integration time is not a multiple of the fluorescence period, amount of integrated light can vary per field due to a slow drift in the mains frequency. Here, TL and TS represent Long and Short exposure time periods interlinked with the ratio R between them. This is why the long integration time has to be set to be a multiple of the fluorescence period, for instance to $\frac{1}{100}$ s in 50 Hz mains area and to $\frac{1}{120}$ s in 60 Hz mains area, as in FIG. 2. Frequency/phase of the mains does not influence the amount of the gathered light during the long exposure period. However, due to a slow drift in the mains frequency or a variable exposure time, the amount of gathered light from the short exposure period varies in time. This can lead to a light flicker and variable coloring due to various positions of long and short exposure times with respect to the oscillation period of the fluorescent light.

Although this provides a good solution for the Long exposure period, light gathered within Short exposure period is inevitably sampled at various position of the oscillation period of fluorescent light. Firstly, due to a slow frequency/phase drift, amount of light gathered within short exposure time period is variable and can be observed as the low-frequency flicker in brighter parts of the scene. Secondly, output of the fluorescent light tube is also not constant in color, but has different colors within the period. Depending on the type of fluorescent light, for instance, when switching on, fluorescent light is more red (period A in FIG. 2), in the peak of the period it is white (period B in FIG. 2) and at the end (switching of), it can be blue (period C in FIG. 2).

To solve for the problem of low-frequency intensity flicker and variable coloration present in the Short exposure periods two basic solutions are proposed:

Firstly, if fluorescent light is detected in a scene, the long exposure time is made equal to a multiple of fluorescence light period (for instance to $\frac{1}{100}$ s or $\frac{1}{120}$ s, depending on the mains frequency); by gain and color de-saturation, problematic image parts which are constructed from the short exposure time are as much as possible shifted out of the display range and their color saturation is reduced;

Secondly, if fluorescent light is detected in the scene, the longer exposure time is made equal to a multiple of the fluorescence light period (for instance to $\frac{1}{100}$ s or $\frac{1}{120}$ s, depending on the mains frequency). Essentially, a fluorescence locking is performed so that the time period within which the short exposure integration is being taken is positioned at the most optimal moment within the fluorescent light period, namely at the peak (maximum) of the fluorescent light output (case B in FIG. 2). Likewise, it is effected that light integrated during the short integration time is constant in time and has a correct color (not influenced by the fluorescence light output).

Figure 3:
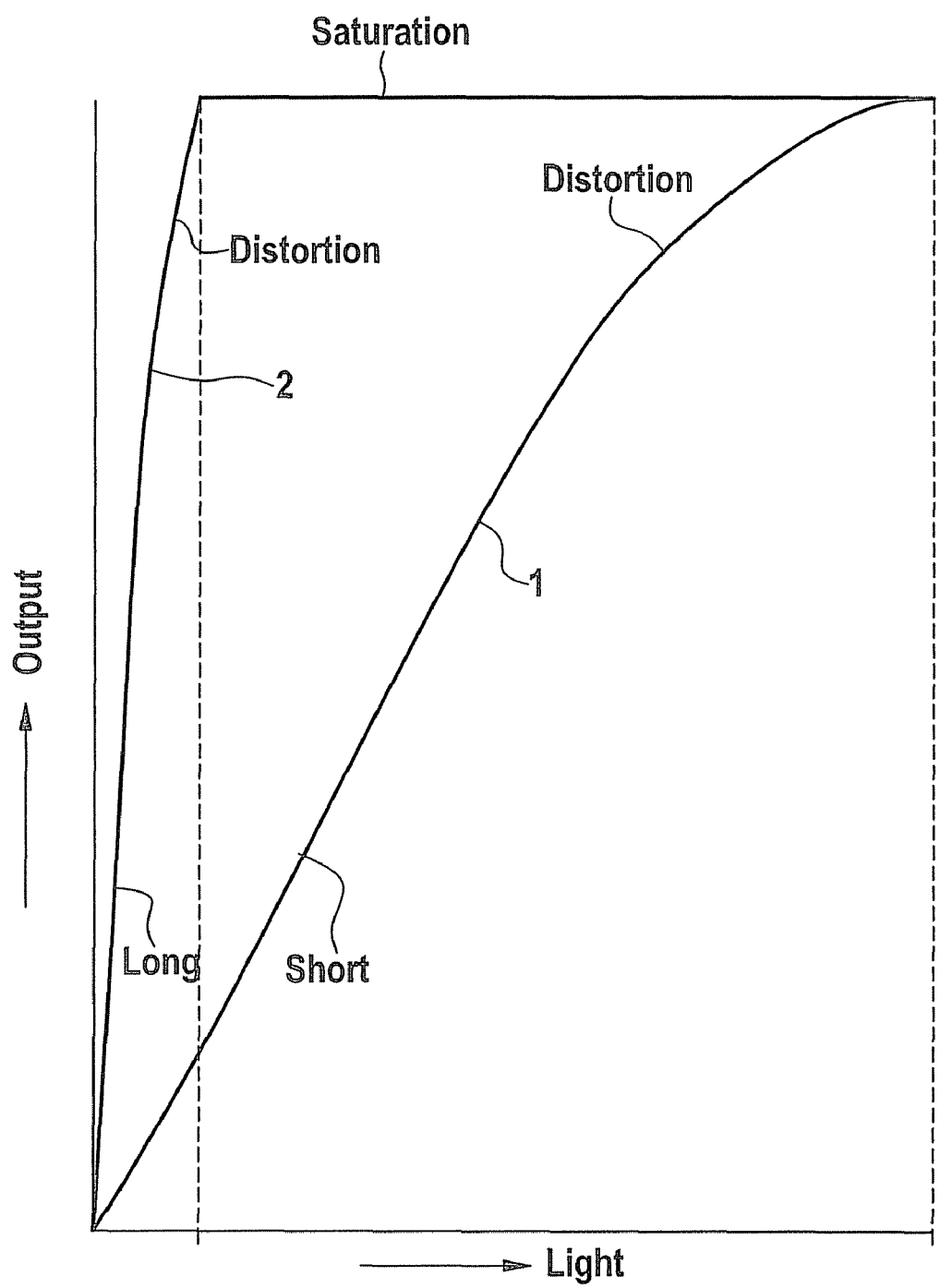
FIG. 3 is a line graph showing image signals as a function of light level for two different exposure times.
Figure 4:
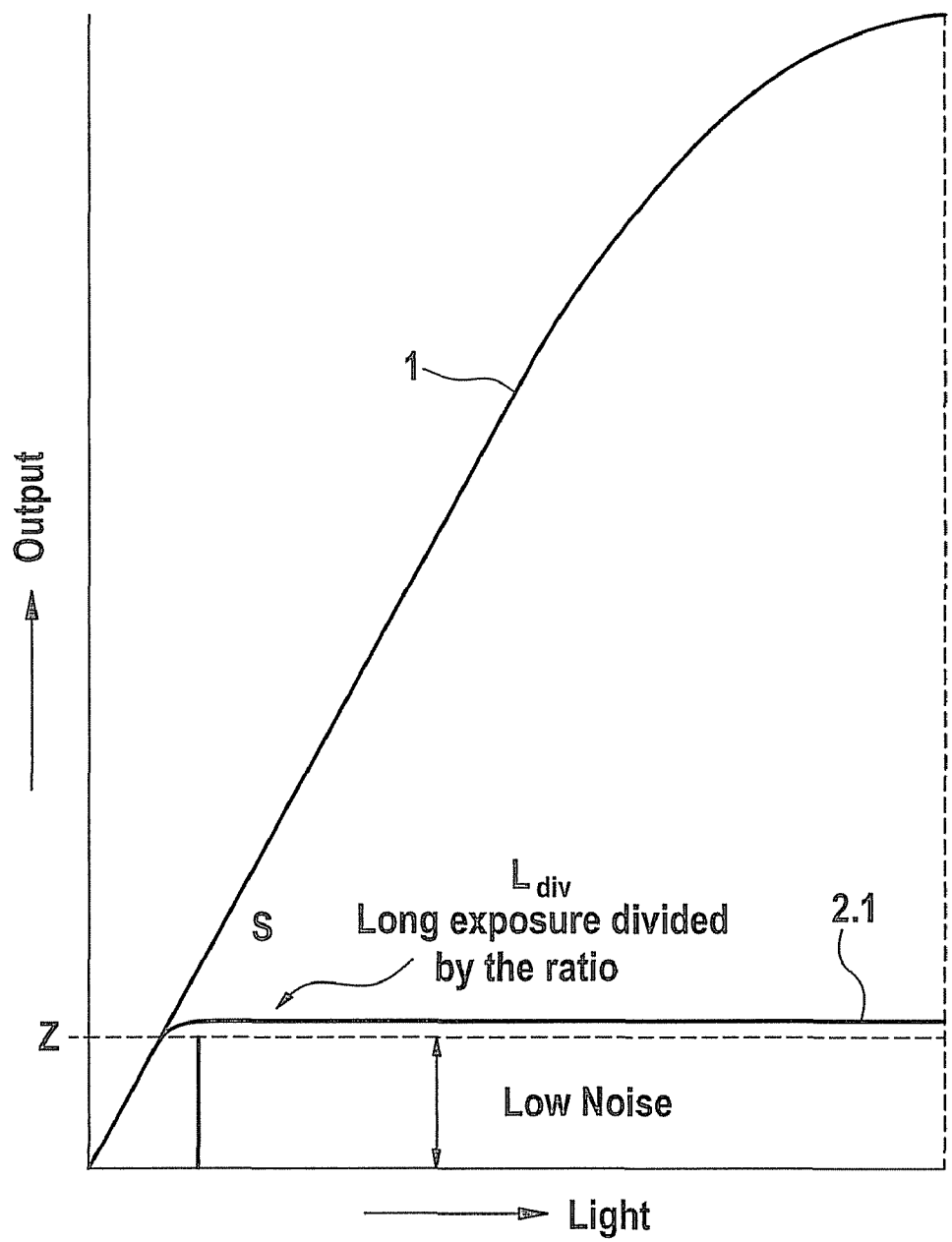
FIG. 4 is a line graph showing image signals as a function of light level, the curve representing a longer exposure time having been processed by a multiplication (applying a factor smaller than 1).
Figure 5:
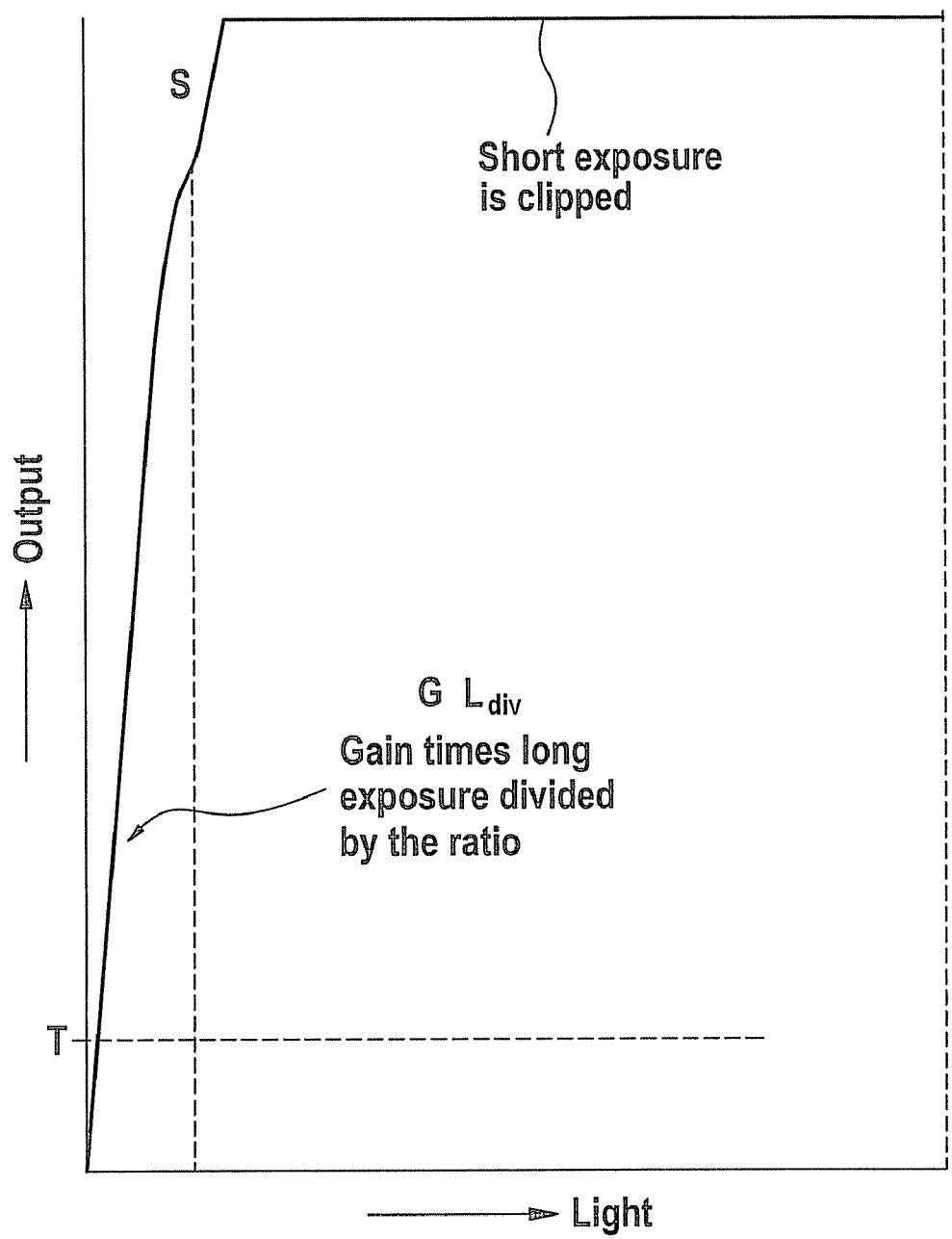
FIG. 5 is a line graph illustrating application of a gain to the line graphs of FIG. 4.

In FIGS. 3 to 5, the following can be observed:

The line graph shown in FIG. 3 shows the functional relation between an input light level (x-axis) and the output signal (y-axis) of an image pickup sensor, especially a CCD-sensor, both of them in arbitrary units. Curve 1 represents the functional relation due to a short exposure time. Curve 2 represents the functional relation due to a long exposure time. Both curves show a linear part before getting distorted and going into saturation. FIG. 4 shows a similar graph after a processing step. During this process the values of the curve 2 are divided by the ratio of the exposure times applied. This results in the curve 2.1 which goes in saturation at rather low values of the light level. Curve 1 representing the functional relation between the input light level and output signal due to a short exposure time remains unchanged. The combination of the two images is achieved for example making use of the principles described in WO 2007/038977, which is hereby incorporated by reference.

Similar to the single exposure camera in the presence of fluorescent light, the long exposure time is, according to the exemplary embodiments and/or exemplary methods of the present invention, made equal to a multiple of fluorescence light period (for instance to $\frac{1}{100}$ s or $\frac{1}{120}$ s, depending on the mains frequency). Long and short exposed images can then be combined to a single image output.

As can be seen in FIG. 5, gain (G) is applied to the combined signal so that image parts, where short exposed parts are used, are shifted out of the output range. Likewise, long exposed image parts (having the integration time of for instance $\frac{1}{100}$ s or $\frac{1}{120}$ s) will constitute the majority of the output signal. If some parts of the short exposure time are left in the scene, color reduction (fading) will be applied on those to remove false colors.

This operation can be performed when it is manually triggered by a user. Also, a fluorescence detector can be provided, and if fluorescent light is detected, previously described operation is performed. Such a fluorescent detector is also within the scope of the exemplary embodiments and/or exemplary methods of the present invention.

If during the normal camera operation the long exposure time is set to some value other than a multiple of the fluorescence period, the amount of integrated light can vary per field due to a slow drift in the mains frequency. This is even more visible for the short exposure time. However, even when the long exposure time is set to a multiple of the fluorescence period, short exposure time still displays the same problem and distorting color errors will be present. To detect if this is the case and if fluorescence light is present in the scene, the following approach is suggested:

The color differences between long and short exposures are measured every field or frame. The long exposure will be constant because it has ¹/₁₀₀ s (or ¹/₁₂₀ s) integration time which is equal to one 100 Hz (120 Hz) cycle of the fluorescent light source. The short exposure may contain large errors because it integrates only a small part (10 ms/R) of the 100 Hz fluorescent cycle. If the camera is not locked to the mains frequency the errors will change over time. Pixels in the long exposure that are saturated may not be taken in account.

Two measurement types are proposed, herein:

Firstly, the average values of long and short exposed pixels in several (n) intensity regions are accumulated. Differences between these measurements at various intensity levels will show periodic (sine-like) behavior in the presence of florescent light in that intensity range.

Furthermore, the color error measurement can be used to detect fluorescent light conditions and to adapt the dual exposure processing. It accumulates the difference between long and short exposed pixels within a certain level range. It also counts the number of pixels that are accumulated. This measurement is done separately for Cr and Cb lines of the complementary mosaic type of sensor. The accumulators and counters are stored and reset for every field/frame. If these measurements show periodic (sine-like) behavior, this indicates the presence of fluorescent light.

Figure 6:
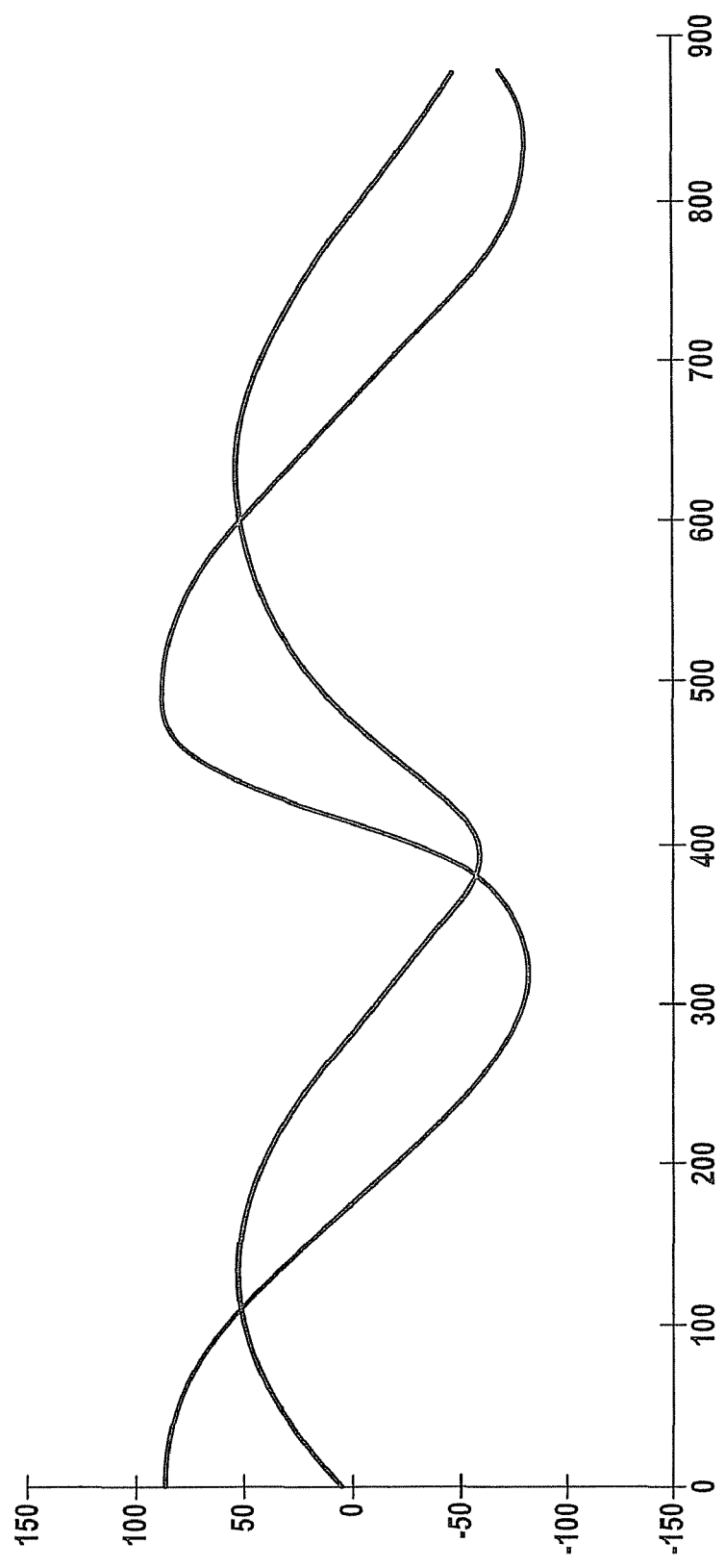
FIG. 6 shows line graphs showing color difference errors in a typical scene with a fluorescent light source.
Figure 7:
FIG. 7 shows a line graph representing the influence of motion with respect to the line graph of FIG. 6.
Figure 8:
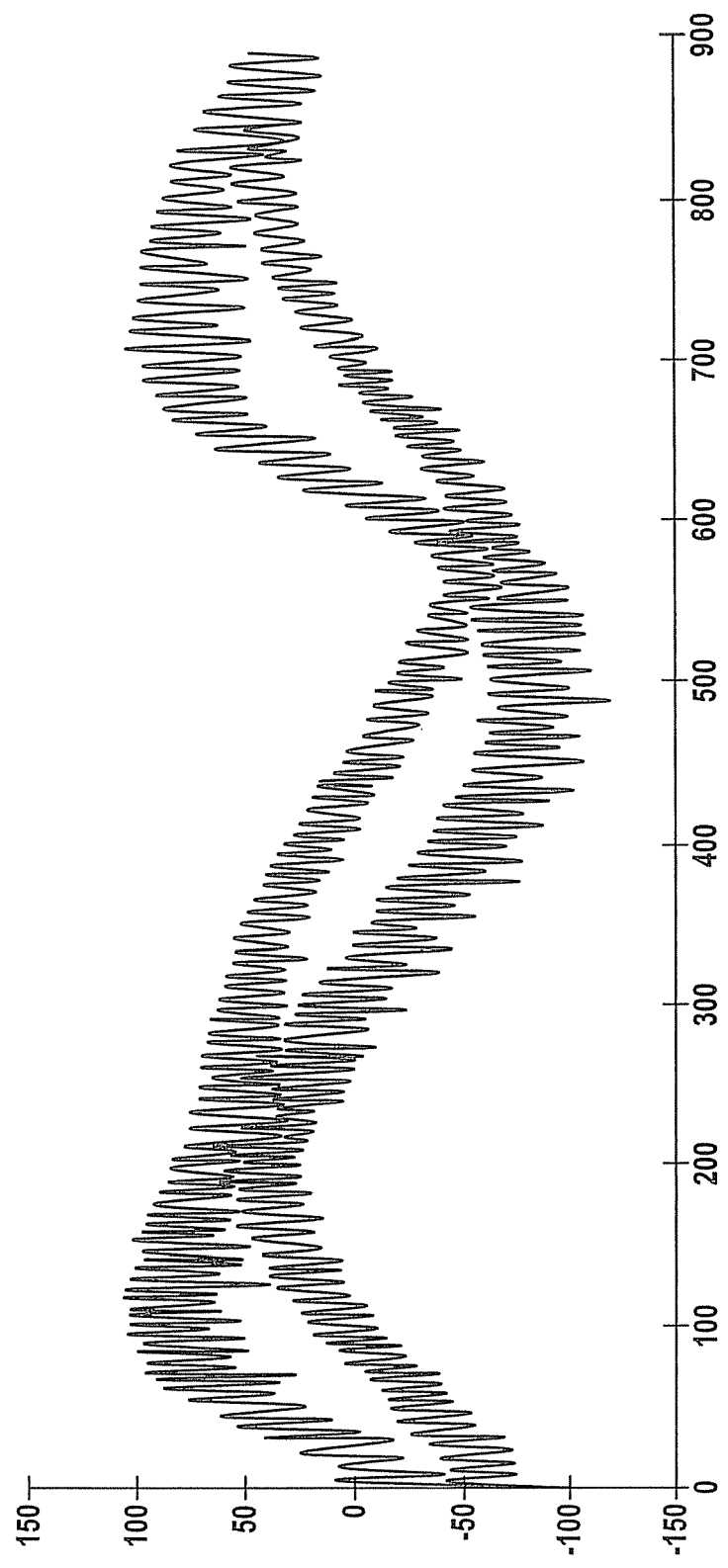
FIG. 8 shows the influence on the line graphs of FIG. 5 by other light sources.

Examples of the color error measurements are shown in FIGS. 6 to 8. The abscissa axis represents time scale.

FIG. 6 shows the color difference errors of the signals Cr and Cb in a typical scene with a fluorescent light source.

FIG. 7 shows the effect of motion in the observed scene on the signals Cr and Cb according to FIG. 6: A noticeable disturbance of the measurement can be observed.

The measurement can also be disturbed by other light sources, as shown in FIG. 8. The errors recorded in this figure are recorded under essentially the same conditions as in FIG. 7, the only difference in the set-up being an active LCD screen visible in part of the scene, leading to the noise observable in this measurement.

Figure 9:
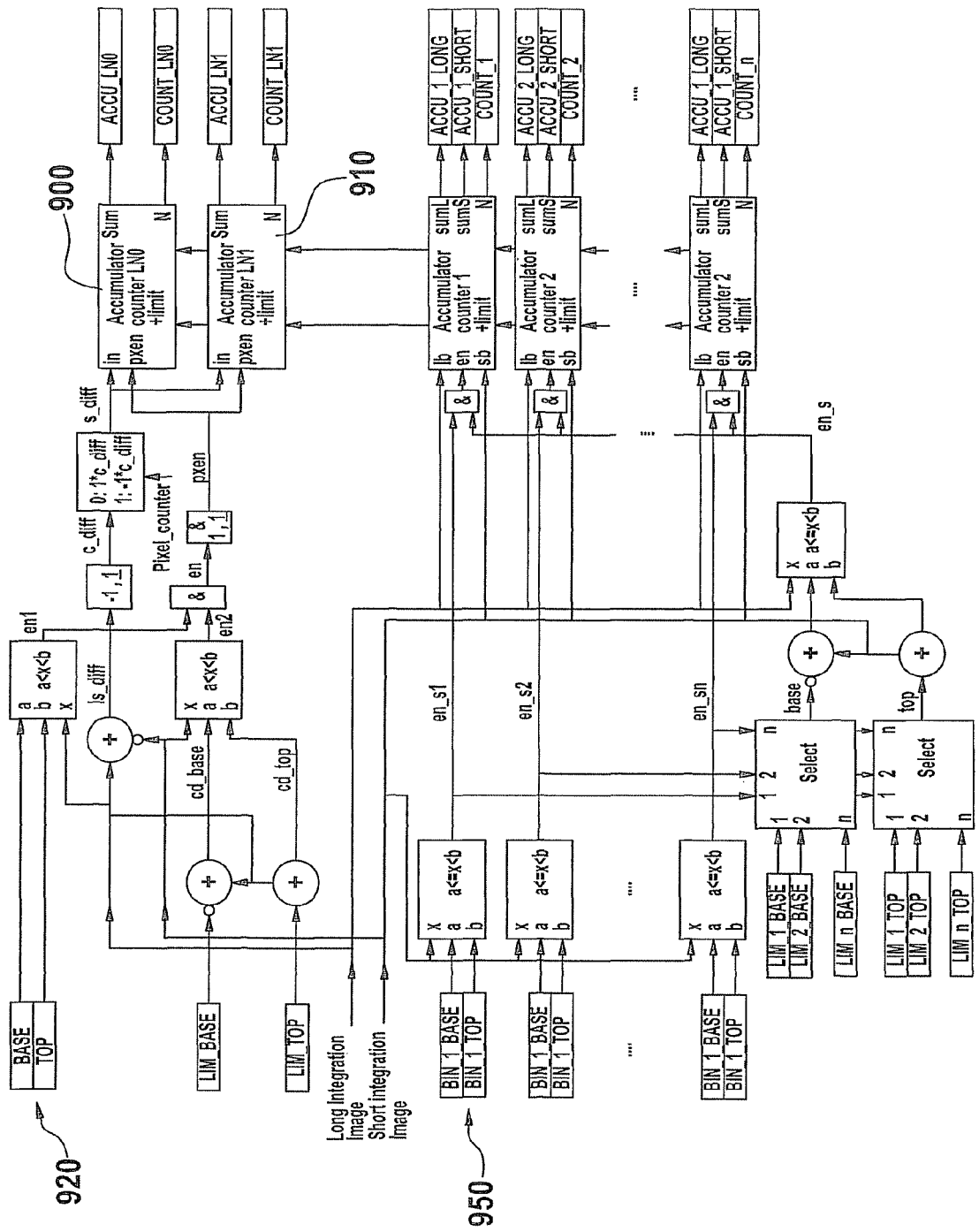
FIG. 9 shows an exemplary embodiment of a measurement block for implementing the present invention.

A measurement block as shown in FIG. 9 can, according to an exemplary embodiment, be used as a fluorescent light detector. In an environment where fluorescent light is the dominating light source there will be differences in luminance and color between long and short exposure. The difference essentially depends on the exposure times and phase relation between exposure and mains frequency.

Accumulator/counter LN0 900 and LN1 910 calculate the differences in color between the short and long exposure. The differences are measured in a range that can be set with BASE and TOP registers 920. If the Long Integration Image pixel is between BASE and TOP values en1 is active. If the difference between long and short exposure is between −LIM_BASE and +LIM_TOP, en2 will be active. Only color differences will be measured, so a differentiator and a pixel alternating sign multiplier are used as simple color separator. LN0 measures one color (Cr or Cb), LN1 the other (Cb or Cr). If both en1 and en2 are active then both pixels are accumulated and the counter is incremented. The accumulator/counter values are copied to the registers when at the end of the filed/frame.

The lower part of the mix measure block (FIG. 9) measures Long Integration Image and Short Integration Image values in n programmable bin ranges 950. If the Short Integration Image signal falls within one of the bin ranges set by BIN_x_TOP and BIN_x_BASE, (x=1 ... n) the correct limits around Short Integration Image are selected set by LIM_x_BASE and LIM_x_TOP for the signal Long Integration Image to filter out extremes that could spoil the measurement. Such extremes can for instance occur in the presence of motion and/or light changes in the scene. Using LIM_x_BASE and LIM_x_TOP , as well as LIM_BASE and LIM_TOP, one can exclude the majority of these disturbances from the scene, since when Long and Short exposure signal are very different from each other, it is assumed that these differences originate from disturbances and not from fluorescent light. Likewise, measurement of these image parts can be disabled by setting the en_s, en1 and en2 to zero.

In addition, error signals should be filtered to remove all the spectral components that do not belong to the model of fluorescent light. If we assume that maximum deviation of the mains frequency from its nominal value is 1%, filters have to filter out all spectral components out of that range. Filter blocks (not shown in FIG. 9) can be also implemented in software.

Also, remainders of disturbances originating from the motion or other light changes in the scene are filtered out in the software part of the algorithm. All these measures are implemented for both the intensity as well as color error measurements.

An alternative/additional manner to skip measurements originating from motion or light change and not from the fluorescent light is to use an external signal that originates from different type of measurement and distinguishes between real light change and moving objects.

Pixels passing both tests enable summation of Short Integration Image and Long Integration Image and the counting of N over the field time. The accumulators are limited to prevent overflow. If one of the measurements hits the maximum, the corresponding bin width must be adapted.

For the n signals en_sx: en_sx=1 when BIN_x_BASE<sb<BIN_x_TOP.

When Short Integration Image pixel value falls into a bin, the second test is done where Long Integration Image pixel value should fall in a range around the Short Integration Image pixel value:

If en_sx=1, then the selector switches to: base=LIM_x_BASE and top=LIM_x_TOP, and when short−base<long<short+top, then en_s=1

If both tests en_s=1 and en_sx=1 then accumulator x is enabled.

The accumulators add pixel values belonging to the long integration time, short integration time and count the number when (en_sx=1 and en_s=1) over a complete field/frame.

Finally, if these two measurement types as previously described show periodic (sine-like) behavior, this indicates the presence of florescent light sources in the scene. In case when camera mains locking is used, these measurement signals are likely to be constant values in time, and if they are constant non-zero in time, this is an indication of the presence of florescent light sources in the scene.

According to a further exemplary embodiment, fluorescence locking is performed so that the time within which the short exposure integration is taken is positioned at the most optimal moment within the fluorescent light period, namely at the peak (maximum) of the fluorescent light output (case B in FIG. 2); likewise, it is made sure that light integrated during the short integration time is constant in time and has a correct color (not influenced by the fluorescence light output). To achieve this, (color) errors between long and short exposure time are observed and used as a control signal to drive the Phase Locked Loop such that it assures the correct phase (read-out moment) of the short exposure time with respect to the fluorescent lighting. When the correct read-out moment is selected for the short exposure time, color errors are either constant or do not exist: they do not show oscillatory (periodic) behavior.

Input for the PLL can be for instance one or more of the (color) error signals or some combination of them. The current scheme not only compensates for the phase difference between the optimal read moment and the current read moment of the short integration image, but also for the frequency difference of the actual and ideal mains lock frequencies. Namely, due to a frequency drift of mains (usually up to 1% of a nominal value), sampled light in the short exposure time changes the color temperature and dominant color content in time, which is also prevented in the scheme as now proposed.

Figure 2:
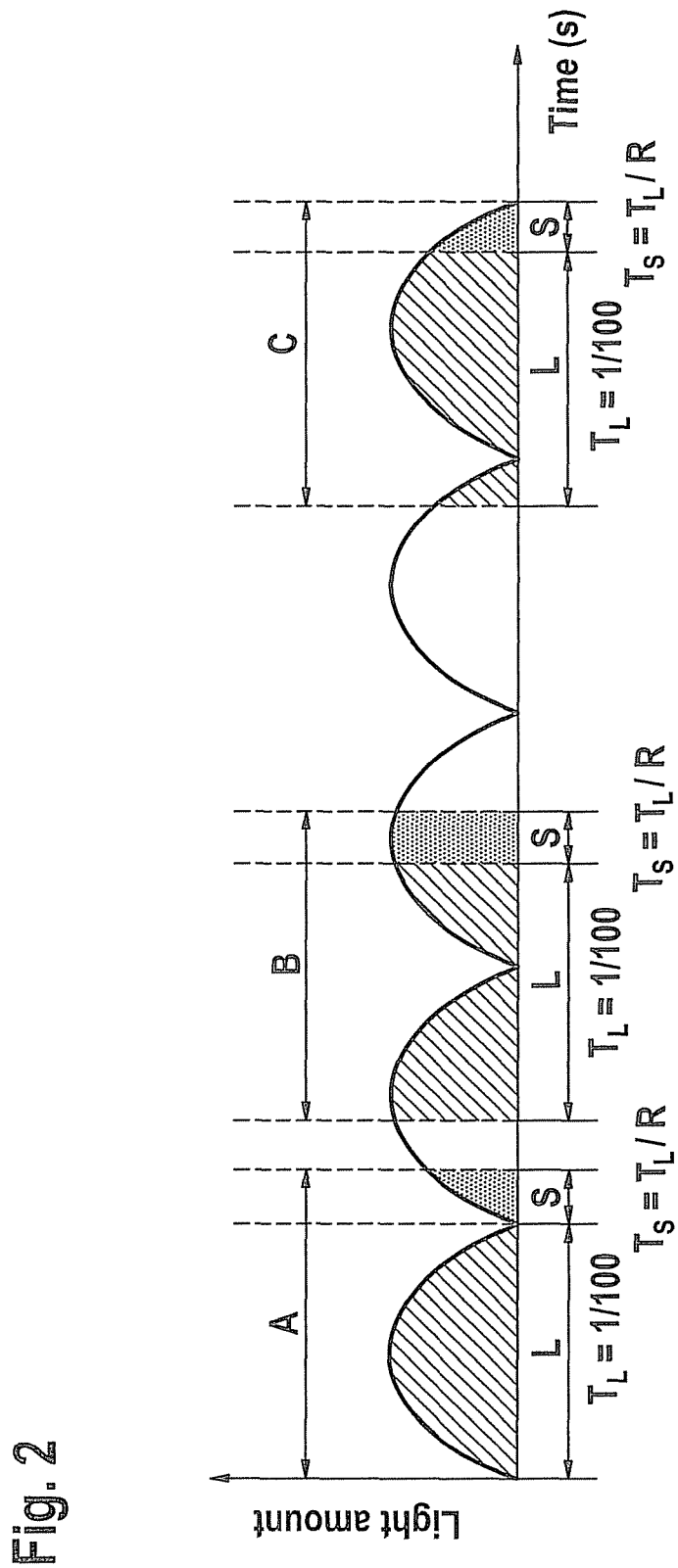
FIG. 2 shows a graph similar to FIG. 1, wherein a long exposure time is set to a multiple of the fluorescent light period.

The way that fluorescent locking control may be achieved is by changing the camera frequency so that it runs on the same current mains frequency (which is used for driving the fluorescent light sources) and that its phase is adjusted such that the short integration image is positioned at the peak (maximum) of the fluorescent light output (case B in FIG. 2). When multi-phase fluorescent light is present in the scene, the camera will lock to the phase that gives the majority output signal. Usually, all mains phases run synchronously with each other and if the camera locks to one of them, mutual relation will be maintained. This means that light sources having the phase other than one the camera is locked to will have a constant phase relationship and will be producing constant light output/color.

The invention claimed is:

1. A method for processing an image signal for double or multiple exposure cameras, the method comprising:
   determining whether fluorescent light is present;
   if so, ascertaining the period of the fluorescent light;
   forming a plurality of image signals having different exposure conditions with at least one image pickup sensor, such that at least a long exposure time is made equal to a multiple of the fluorescent light period, and a short exposure time is made equal to a fraction of the long exposure time;
   correcting at least part of the plurality of image signals with a correction function in order to obtain a corrected output signal;
   combining at least one of said plurality of image signals and said corrected output signal to form a combined image signal; and
   applying a gain factor G to the combined image signal, so that at least some image areas are shifted out of a display range.

2. The method of claim 1, further comprising:
   reducing the color saturation of image areas shifted out of the display range.

3. The method of claim 1, wherein to determine, whether fluorescent light is present, color differences between long exposure times and short exposure times are monitored over time.

* * * * *